(12) United States Patent
Jain et al.

(10) Patent No.: US 11,773,732 B2
(45) Date of Patent: Oct. 3, 2023

(54) ROTOR BLADE WITH PROTECTIVE LAYER

(71) Applicant: General Electric Company, Schenectady, NY (US)

(72) Inventors: Nitesh Jain, Bangalore (IN); Nicholas Joseph Kray, Mason, OH (US); Abhijeet Jayshingrao Yadav, Bangalore (IN)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 17/236,257

(22) Filed: Apr. 21, 2021

(65) Prior Publication Data

US 2022/0341333 A1 Oct. 27, 2022

(51) Int. Cl.
*F01D 5/28* (2006.01)
*F02C 7/24* (2006.01)
*F01D 5/14* (2006.01)

(52) U.S. Cl.
CPC ............ *F01D 5/282* (2013.01); *F01D 5/147* (2013.01); *F02C 7/24* (2013.01); *F05D 2240/30* (2013.01); *F05D 2260/96* (2013.01); *F05D 2300/44* (2013.01); *F05D 2300/603* (2013.01); *F05D 2300/614* (2013.01)

(58) Field of Classification Search
None
See application file for complete search history.

(56) References Cited

U.S. PATENT DOCUMENTS

| 3,607,600 | A | * | 9/1971 | Schreter | ............... F04D 29/4286 156/289 |
| 4,234,648 | A | | 11/1980 | Patz et al. | |
| 5,785,498 | A | | 7/1998 | Quinn et al. | |
| 6,254,756 | B1 | * | 7/2001 | Maricocchi | ............... C23C 4/01 205/228 |
| 6,827,969 | B1 | * | 12/2004 | Skoog | .................. C04B 35/111 427/403 |
| 8,091,227 | B2 | | 1/2012 | Hong | |
| 8,178,205 | B2 | | 5/2012 | Hong | |
| 8,522,614 | B2 | | 9/2013 | May et al. | |
| 10,047,613 | B2 | * | 8/2018 | Ford | ........................ F01D 5/288 |
| 10,569,481 | B2 | | 2/2020 | Gallier et al. | |
| 2013/0260130 | A1 | * | 10/2013 | Taxacher | ............... C23C 28/341 106/482 |
| 2014/0186166 | A1 | * | 7/2014 | Kostka | .................... F01D 5/143 415/182.1 |
| 2016/0222806 | A1 | * | 8/2016 | Jennings | ................. F01D 5/284 |
| 2019/0242260 | A1 | | 8/2019 | Kray et al. | |
| 2019/0360345 | A1 | * | 11/2019 | De Gaillard | ....... B29D 99/0025 |
| 2019/0366656 | A1 | | 12/2019 | Roberts et al. | |
| 2021/0324747 | A1 | * | 10/2021 | Charlas | .............. B29D 99/0025 |

* cited by examiner

*Primary Examiner* — Woody A Lee, Jr.
*Assistant Examiner* — Cameron A Corday
(74) *Attorney, Agent, or Firm* — Dority & Manning, P.A.

(57) ABSTRACT

A component for a turbine engine is provided. The component includes a main body portion having a flow path surface; and a protective layer formed of a chopped fiber material, the protective layer cohered to at least a portion of the flow path surface of the main body portion.

7 Claims, 5 Drawing Sheets

ROTOR BLADE WITH PROTECTIVE LAYER

FIELD

The present subject matter relates generally to a turbine engine, or more particularly to components of a turbine engine including a protective layer.

BACKGROUND

A gas turbine engine generally includes a turbomachine, the turbomachine including, in serial flow order, a fan section, a compressor section, a combustion section, a turbine section, and an exhaust section. During operation of the turbomachine, the gas turbine engine drives or otherwise rotates the rotor blades of these sections relative to a nacelle. The rotation of the rotor blades, in turn, generates a flow of pressurized air, which may support the operation of the gas turbine engine and/or be used as propulsive thrust for propelling an aircraft.

Rotor blades are prone to foreign object damage hazards like bird strikes, hail, ice, sandstorms, and other foreign objects. Conventional rotor blades include a polyurethane portion to help protect against such foreign object damage hazards and may suffer damage under these foreign object conditions.

BRIEF DESCRIPTION

Aspects and advantages of the invention will be set forth in part in the following description, or may be obvious from the description, or may be learned through practice of the invention.

In one exemplary embodiment of the present disclosure, a component for a turbine engine is provided. The component includes a main body portion having a flow path surface; and a protective layer formed of a chopped fiber material, the protective layer cohered to at least a portion of the flow path surface of the main body portion.

In certain exemplary embodiments the chopped fiber material includes at least a first chopped fiber and a second chopped fiber.

In certain exemplary embodiments the chopped fiber material further includes a polymeric resin.

In certain exemplary embodiments the chopped fiber material includes at least one of a metallic fiber, an aramid fiber, a carbon fiber, and a S-glass fiber.

In certain exemplary embodiments a fiber volume range of the chopped fiber material is approximately 5% to approximately 30%.

In certain exemplary embodiments a fiber length of the chopped fiber material is approximately 0.001 inches to approximately 1.0 inches.

In certain exemplary embodiments a thickness of the protective layer is approximately 5 mils to approximately 200 mils.

In certain exemplary embodiments the protective layer is co-cured to the pressure-side surface of the blade body.

In certain exemplary embodiments the main body portion comprises a rotor blade comprising a blade body that extends from a root section to a tip along a radial direction, the blade body including a pressure-side surface and an opposing suction-side surface, wherein the pressure-side surface and the suction-side surface are interconnected at a leading edge of the blade body and a trailing edge of the blade body, wherein the protective layer is cohered to at least a portion of the pressure-side surface of the blade body.

In certain exemplary embodiments the blade body is formed of a first material that is different than the chopped fiber material.

In certain exemplary embodiments the rotor blade is positioned within one of a fan, a compressor section, or a turbine section.

In certain exemplary embodiments the chopped fiber material includes at least a first chopped fiber and a second chopped fiber.

In certain exemplary embodiments the chopped fiber material further includes a polymeric resin.

In certain exemplary embodiments the chopped fiber material includes at least one of a metallic fiber, an aramid fiber, a carbon fiber, and a S-glass fiber.

In certain exemplary embodiments the main body portion comprises a static structure disposed in an air flow path of the turbine engine, wherein the protective layer is cohered to at least a portion of the static structure.

In certain exemplary embodiments the chopped fiber material includes at least a first chopped fiber and a second chopped fiber.

In certain exemplary embodiments the chopped fiber material further includes a polymeric resin.

In certain exemplary embodiments the protective layer is co-cured to the static structure.

In certain exemplary embodiments the static structure is an outlet guide vane of the turbine engine.

In certain exemplary embodiments the static structure is an acoustic panel of the turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
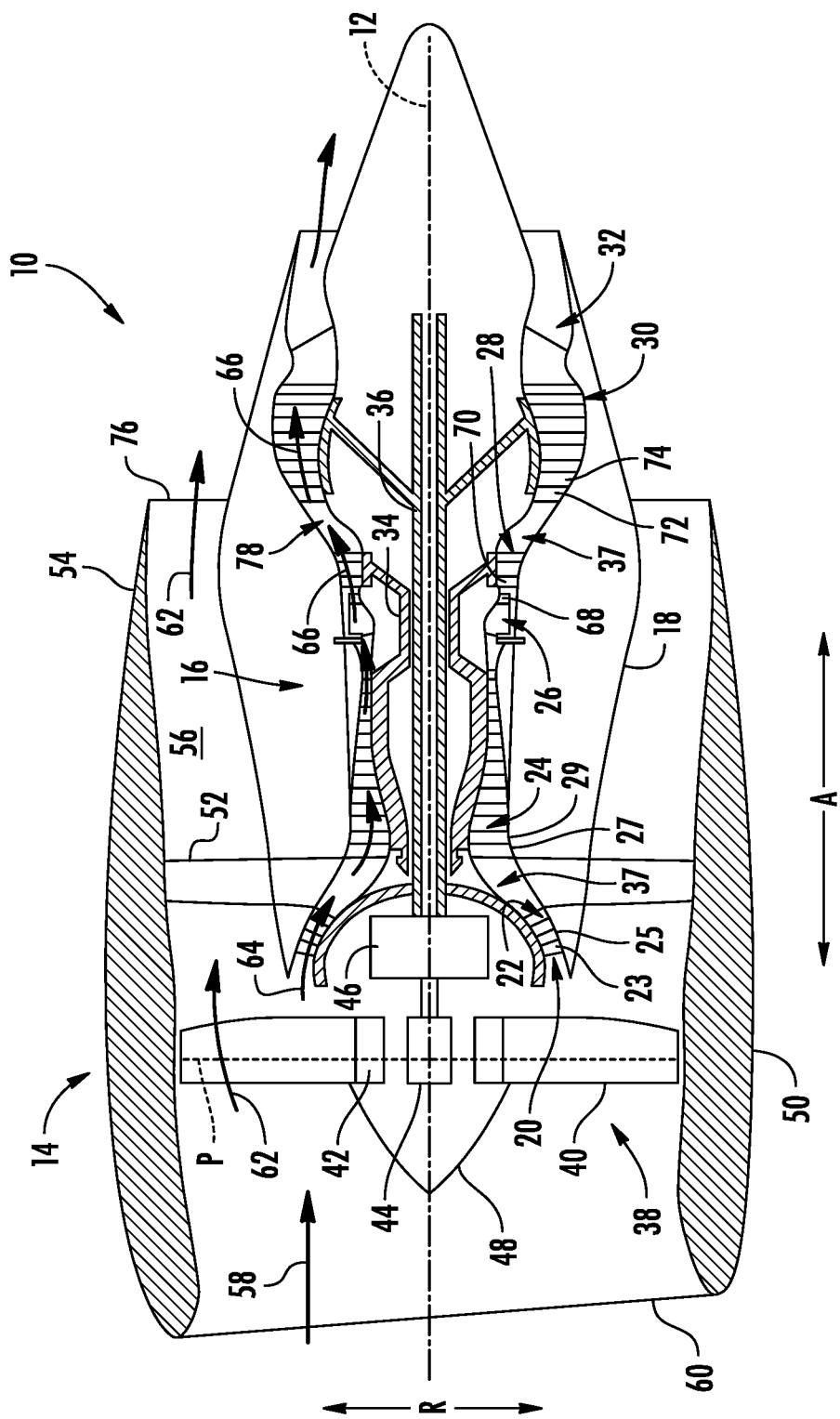
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A component for a turbine engine of the present disclosure includes a main body portion having a flow path surface and a protective layer formed of a chopped fiber material. The protective layer is cohered to at least a portion of the flow path surface of the main body portion.

The protective layer formed of various random chopped fiber materials of the present disclosure has an improved strength to provide better protection to portions of a turbine engine against foreign object damage conditions and provides a protective layer that is easier to repair.

It is contemplated that a protective layer of the present disclosure may be cohered to rotating and static components of a turbine engine. For example, in some exemplary embodiments, the main body portion may comprise a rotor blade including a blade body that extends from a root section to a tip along a radial direction, the blade body including a pressure-side surface and an opposing suction-side surface, wherein the pressure-side surface and the suction-side surface are interconnected at a leading edge of the blade body and a trailing edge of the blade body. In such exemplary embodiments, the protective layer is cohered to at least a portion of the pressure-side surface of the blade body.

Furthermore, in other exemplary embodiments, the main body portion may comprise a static structure disposed in an air flow path of a turbine engine. In such exemplary embodiments, the protective layer is cohered to at least a portion of the static structure.

Referring now to the drawings, wherein identical numerals indicate the same elements throughout the figures, FIG. 1 is a schematic cross-sectional view of a turbine engine in accordance with an exemplary embodiment of the present disclosure. More particularly, for the embodiment of FIG. 1, the turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flow path 37 extending therethrough. Each compressor 22, 24 may, in turn, include one or more rows of stator vanes interdigitated with one or more rows of compressor rotor blades. Moreover, each turbine 28, 30 may, in turn, include one or more rows of stator vanes interdigitated with one or more rows of turbine rotor blades. In exemplary embodiments, the LP compressor 22 includes sequential stages of LP compressor stator vanes 23 and LP compressor rotor blades 25 and the HP compressor 24 includes sequential stages of HP compressor stator vanes 27 and HP compressor rotor blades 29. Furthermore, the LP turbine 30 includes sequential stages of LP turbine stator vanes 72 and LP turbine rotor blades 74 and the HP turbine 28 includes sequential stages of HP turbine stator vanes 68 and HP turbine rotor blades 70.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed. In an exemplary embodiment of the present disclosure, the fan 14 may include a number of rotor stages, each of which includes a row of fan blades or rotor airfoils mounted to a rotor having a rotatable disk. The fan 14 may also include at least one stator stage including a row of stationary or stator airfoils that serve to turn the airflow passing therethrough. As used herein, the term "fan" refers to any apparatus in a turbine engine having a rotor with airfoils operable to produce a fluid flow. It is contemplated that the principles of the present invention are equally applicable to multi-stage fans, single-stage fans, and other fan configurations; as well as with low-bypass turbofan engines, high-bypass turbofan engines, and other engine configurations.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, open rotor or unducted turbofan engine, a land-based gas turbine engine for power generation, an aeroderivative gas turbine engine, etc.

Figure 2:
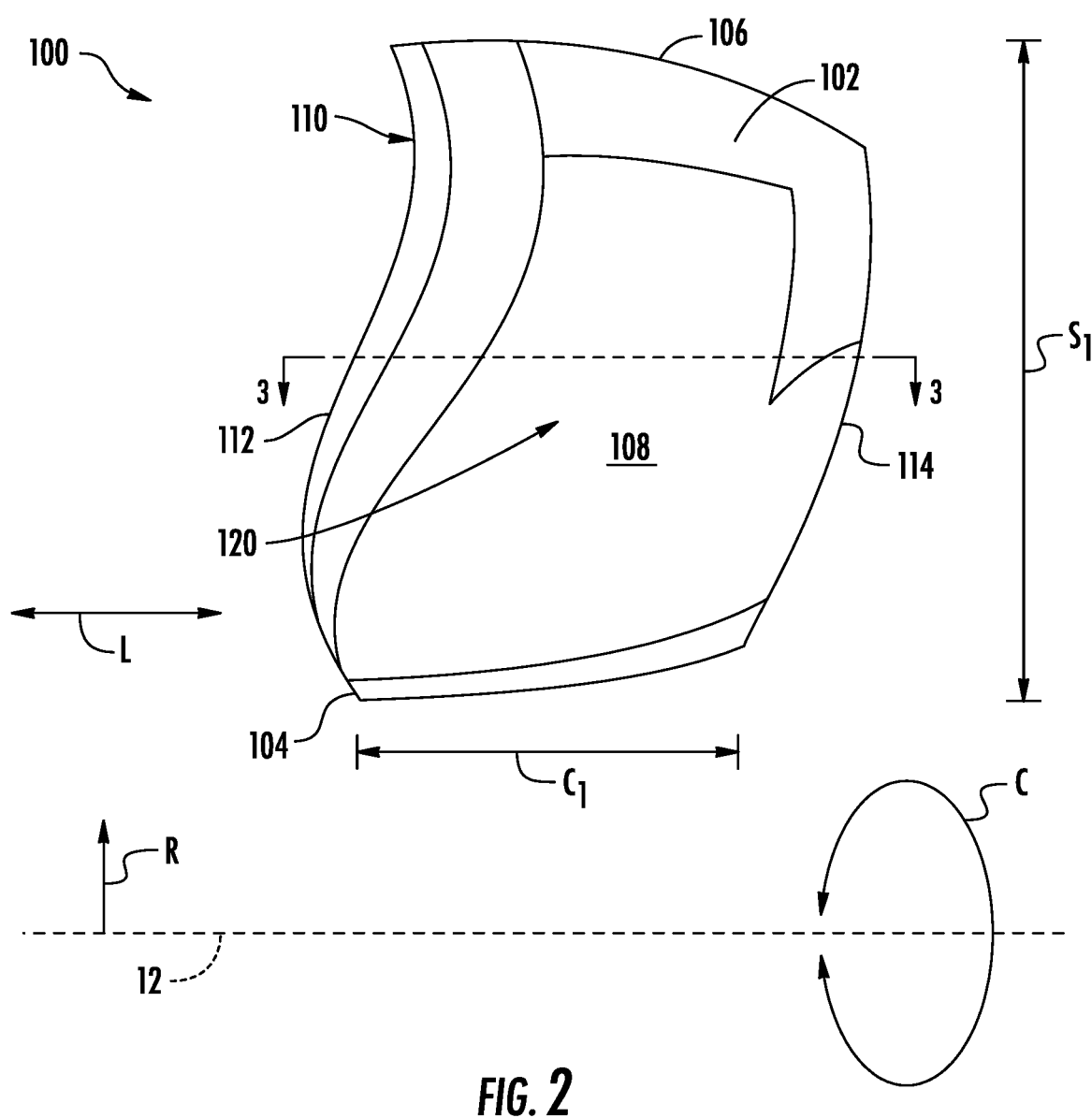
FIG. 2 is a side elevation view of a rotor blade of a gas turbine engine in accordance with an exemplary embodiment of the present disclosure.

FIGS. 2-5 illustrate exemplary embodiments of the present disclosure. It is contemplated that a protective layer of the present disclosure may be cohered to rotating (FIGS. 2-4) and static components (FIG. 5) of a turbine engine. FIG. 2 is a side elevation view of a main body portion, e.g., a rotor blade, 100 in accordance with an exemplary embodiment of the present disclosure, which may be incorporated into the engine 10 in place of any of the fan rotor blades 40, the compressor rotor blades 25, 29 (FIG. 1), and/or the turbine rotor blades 70, 74 (FIG. 1). As shown, the rotor blade 100 defines a longitudinal direction L, a radial direction R, and a circumferential direction C. In general, the longitudinal direction L extends parallel to the axial centerline 12 of the engine 10, the radial direction R extends generally orthogonal to the axial centerline 12, and the circumferential direction C extends generally concentrically around the axial centerline 12.

Figure 3:
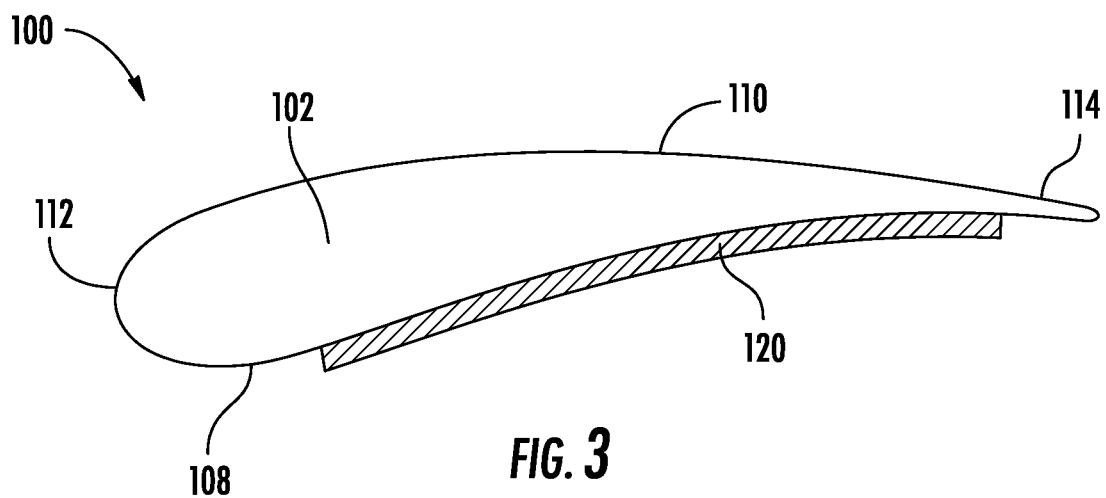
FIG. 3 is a top elevation cross-sectional view of a rotor blade of a gas turbine engine in accordance with an exemplary embodiment of the present disclosure.
Figure 4:
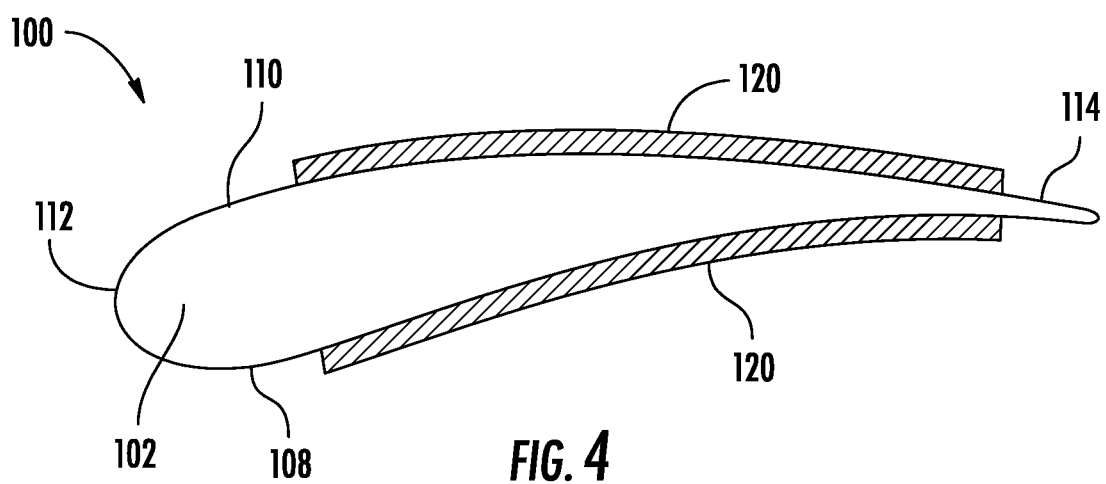
FIG. 4 is a top elevation cross-sectional view of a rotor blade of a gas turbine engine in accordance with another exemplary embodiment of the present disclosure.
Figure 5:
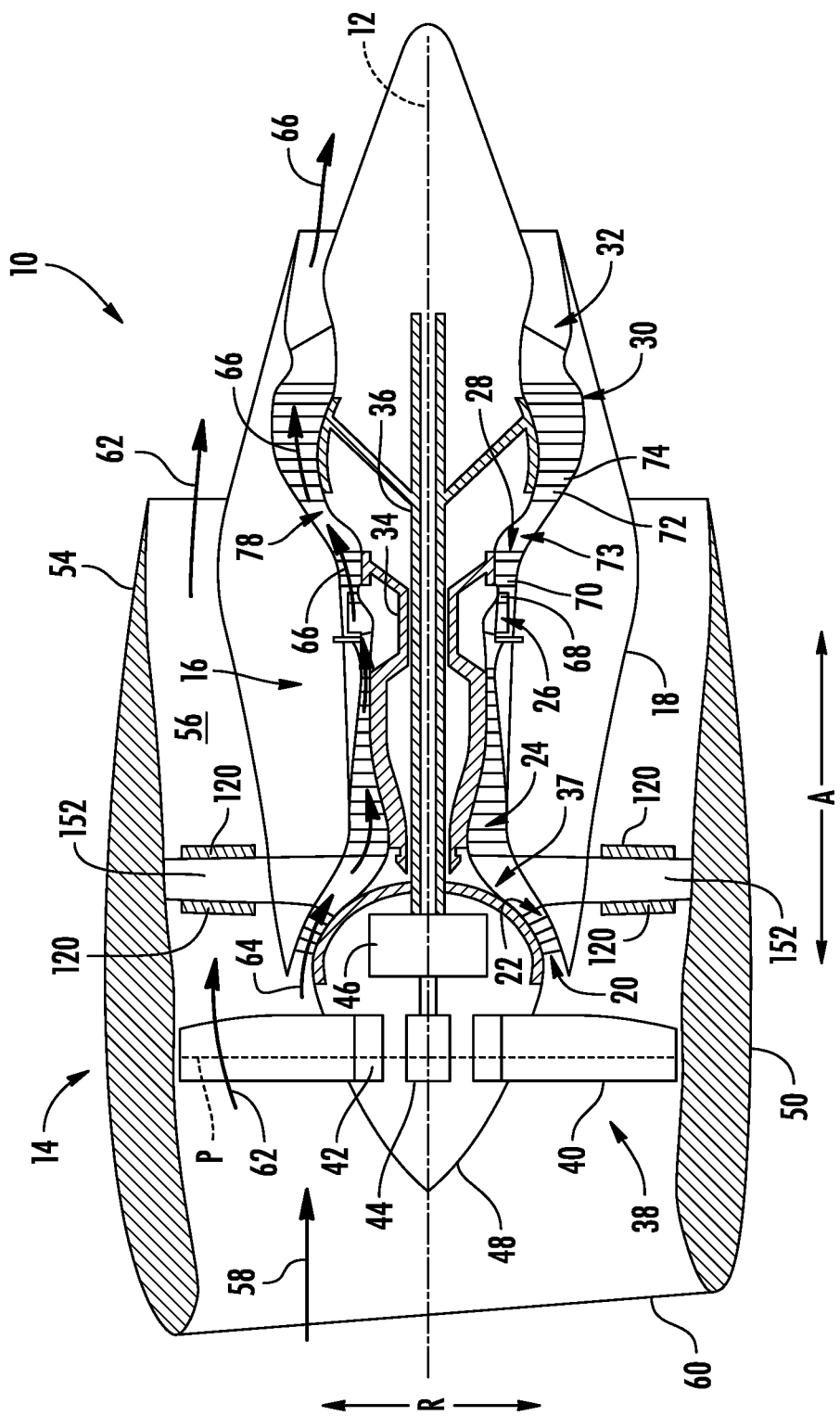
FIG. 5 is another schematic, cross-sectional view of an exemplary gas turbine engine in accordance with exemplary embodiments of the present disclosure.

Referring to FIGS. 2-3, in an exemplary embodiment, the rotor blade 100 includes a blade body 102 that extends from a root section 104 to a tip 106 along the radial direction R. Furthermore, the blade body 102 includes a flow path surface, e.g., a pressure-side surface 108 and an opposing suction-side surface 110. In this respect, the pressure-side surface 108 and the suction-side surface 110 are joined together or interconnected at a leading edge 112 of the blade body 102 and a trailing edge 114 of the blade body 102.

Referring to FIG. 2, each blade body 102 has a span, or span dimension, "S1" defined as the radial distance from the root 104 to the tip 106, and a chord, or chord dimension, "C1" defined as the length of an imaginary straight line connecting the leading edge 112 and the trailing edge 114.

Depending on the specific design of the rotor blade 100, its chord C1 may be different at different locations along the span S1. In one embodiment, a relevant measurement is the chord C1 at the root 104 of the rotor blade 100.

Additionally, as will be described below, the root section 104 secures the rotor blade 100 to a rotor disk (not shown) coupled to the LP shaft 36 (FIG. 1) or HP shaft 34 (FIG. 1). However, in alternative exemplary embodiments, the rotor blade 100 may have any other suitable configuration. For example, in one embodiment, the rotor blade 100 may include a platform positioned between the blade body 102 and the root section 104 along the radial direction R.

Referring to FIGS. 2-3, in an exemplary embodiment, the rotor blade 100 includes a protective layer 120 that is cohered to at least a portion of the flow path surface of the main body portion, e.g., pressure-side surface 108 of the blade body 102. The protective layer 120 is formed of a chopped fiber material. In this manner, the protective layer 120 provides protection to the pressure-side surface 108 of the blade body 102 against foreign object damage conditions.

For example, the protective layer 120 may be formed of various random chopped fiber materials including at least one of a metallic fiber, an aramid fiber, a carbon fiber, a S-glass fiber, and other fiber materials. In one exemplary embodiment, the protective layer 120 is formed of at least a first chopped fiber and a second chopped fiber. For example, a first chopped fiber of the protective layer 120 may be formed of a metallic fiber, an aramid fiber, a carbon fiber, a S-glass fiber, a metallic film, and/or other fiber materials. Furthermore, a second chopped fiber of the protective layer 120 may be formed of a metallic fiber, an aramid fiber, a carbon fiber, a S-glass fiber, a metallic film, and/or other fiber materials. It is contemplated that the first chopped fiber is a different chopped fiber material than the second chopped fiber. In an exemplary embodiment, the protective layer 120 also includes a polymeric resin. In other exemplary embodiments, the protective layer 120 includes a layer of metallic film. In other exemplary embodiments, the protective layer 120 may also include a polyurethane resin.

In an exemplary embodiment, the protective layer 120 is formed of various random chopped fiber materials having an improved strength to provide a protective layer 120 to portions of the rotor blade 100 against foreign object damage conditions.

In one exemplary embodiment, a fiber volume range of the chopped fiber material is approximately 5% to approximately 30%. In another exemplary embodiment, a fiber volume range of the chopped fiber material is approximately 5% to approximately 40%. In another exemplary embodiment, a fiber volume range of the chopped fiber material is approximately 5% to approximately 50%.

In one exemplary embodiment, a fiber length of the chopped fiber material is approximately 0.001 inches to approximately 1.0 inches. In another exemplary embodiment, a fiber length of the chopped fiber material is approximately 0.001 inches to approximately 1.5 inches. In another exemplary embodiment, a fiber length of the chopped fiber material is approximately 0.001 inches to approximately 2.0 inches.

In one exemplary embodiment, a thickness of the protective layer is approximately 5 mils to approximately 200 mils. In another exemplary embodiment, a thickness of the protective layer is approximately 5 mils to approximately 250 mils. In another exemplary embodiment, a thickness of the protective layer is approximately 5 mils to approximately 300 mils.

In exemplary embodiments, the blade body 102 is formed of a first material that is different than the chopped fiber material that the protective layer 120 is formed of. For example, the blade body 102 may be formed from any suitable composite material, e.g., suitable materials used to form a matrix of a final blade body 102 and/or suitable materials that comprise the final blade body 102. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC include, but are not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a matrix material for a MMC include, but are not limited to aluminum, titanium, and combinations thereof. For example, a MMC may be formed from powder metals such as, but not limited to, aluminum powder or titanium powder capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load carrying element. In other exemplary embodiments, the blade body 102 may be formed of carbon laminates.

In other exemplary embodiments, the blade body 102 may be formed from a metallic material or from a combination of composite and metallic materials. In an exemplary embodiment, the blade body 102 includes one or more portions formed from a composite material, such as ceramic matrix composite (CMC) material. In other exemplary embodiments, the blade body 102 includes one or more portions formed from a metallic material, such as a titanium-, aluminum-, and/or nickel-based alloy.

Referring to FIG. 3, in an exemplary embodiment, the rotor blade 100 includes a protective layer 120 that is cohered to at least a portion of the pressure-side surface 108 of the blade body 102. It is contemplated that the protective layer 120 of the present disclosure can be cohered to any other portions of the blade body 102 of the rotor blade 100. For example, referring to FIG. 4, in another exemplary embodiment, the rotor blade 100 includes protective layers 120 that are cohered to at least a portion of the pressure-side surface 108 of the blade body 102 and the suction-side surface 110 of the blade body 102. It is further contemplated that the protective layer 120 of the present disclosure can be cohered to any portions, and in any configurations, to the blade body 102 of the rotor blade 100.

In an exemplary embodiment, the rotor blade 100 includes a protective layer 120 that is co-cured to the pressure-side surface 108 or other portions of the blade body 102. In other exemplary embodiments, the rotor blade 100 includes a protective layer 120 that is cohered to the pressure-side surface 108 or other portions of the blade body 102 in any other securement manner. For example, in another exemplary embodiment, the rotor blade 100 includes a protective layer 120 that is bonded to the pressure-side surface 108 or other portions of the blade body 102 using conventional bonding methods.

It is also contemplated that a protective layer of the present disclosure may also be cohered to portions of static structures disposed in an air flow path of a turbine engine to provide further protection to such static structures. For example, referring to FIG. 5, the engine 10 includes a main body portion, e.g., a static structure, 152 in the air flow path, e.g., in the air flow path 62 or 64 or other air flow path portion. A protective layer 120 that is formed of a chopped fiber material as described herein can be cohered to at least a portion of the static structure 152.

It is contemplated that a protective layer 120 of the present disclosure may be cohered to portions of any static structures 152 disposed in an air flow path of an engine 10, for example, an outlet guide vane of the gas turbine engine, an acoustic panel of the gas turbine engine, any ducts of the gas turbine engine, or other flow path surfaces of static structures of the turbine engine.

Further aspects of the invention are provided by the subject matter of the following clauses:

1. A component for a turbine engine, the component comprising: a main body portion having a flow path surface; and a protective layer formed of a chopped fiber material, the protective layer cohered to at least a portion of the flow path surface of the main body portion.

2. The component of any preceding clause, wherein the chopped fiber material includes at least a first chopped fiber and a second chopped fiber.

3. The component of any preceding clause, wherein the chopped fiber material further includes a polymeric resin.

4. The component of any preceding clause, wherein the chopped fiber material includes at least one of a metallic fiber, an aramid fiber, a carbon fiber, and a S-glass fiber.

5. The component of any preceding clause, wherein a fiber volume range of the chopped fiber material is approximately 5% to approximately 30%.

6. The component of any preceding clause, wherein a fiber length of the chopped fiber material is approximately 0.001 inches to approximately 1.0 inches.

7. The component of any preceding clause, wherein a thickness of the protective layer is approximately 5 mils to approximately 200 mils.

8. The component of any preceding clause, wherein the protective layer is co-cured to the pressure-side surface of the blade body.

9. The component of any preceding clause, wherein the main body portion comprises a rotor blade comprising a blade body that extends from a root section to a tip along a radial direction, the blade body including a pressure-side surface and an opposing suction-side surface, wherein the pressure-side surface and the suction-side surface are interconnected at a leading edge of the blade body and a trailing edge of the blade body, wherein the protective layer is cohered to at least a portion of the pressure-side surface of the blade body.

10. The component of any preceding clause, wherein the blade body is formed of a first material that is different than the chopped fiber material.

11. The component of any preceding clause, wherein the rotor blade is positioned within one of a fan, a compressor section, or a turbine section.

12. The component of any preceding clause, wherein the chopped fiber material includes at least a first chopped fiber and a second chopped fiber.

13. The component of any preceding clause, wherein the chopped fiber material further includes a polymeric resin.

14. The component of any preceding clause, wherein the chopped fiber material includes at least one of a metallic fiber, an aramid fiber, a carbon fiber, and a S-glass fiber.

15. The component of any preceding clause, wherein the main body portion comprises a static structure disposed in an air flow path of the turbine engine, wherein the protective layer is cohered to at least a portion of the static structure.

16. The component of any preceding clause, wherein the chopped fiber material includes at least a first chopped fiber and a second chopped fiber.

17. The component of any preceding clause, wherein the chopped fiber material further includes a polymeric resin.

18. The component of any preceding clause, wherein the protective layer is co-cured to the static structure.

19. The component of any preceding clause, wherein the static structure is an outlet guide vane of the turbine engine.

20. The component of any preceding clause, wherein the static structure is an acoustic panel of the turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A component for a turbine engine, the component comprising:
    a main body portion having a flow path surface, the main body portion comprises a rotor blade comprising a blade body that extends from a root section to a tip along a radial direction, the blade body includes a pressure-side surface and an opposing suction-side surface, and the pressure-side surface and the suction-side surface are interconnected at a leading edge of the blade body and a trailing edge of the blade body; and
    a protective layer formed of a chopped fiber material, the protective layer cohered to at least a portion of the flow path surface of the main body portion,
    wherein the protective layer is cohered to at least a portion of the pressure-side surface of the blade body,
    wherein the blade body is formed of a first material that is different than the chopped fiber material, and
    wherein the chopped fiber material includes at least a first chopped fiber, a second chopped fiber, and a polymeric resin.

2. The component of claim 1, wherein the chopped fiber material includes at least one of a metallic fiber, an aramid fiber, a carbon fiber, and a S-glass fiber.

3. The component of claim 1, wherein a fiber volume range of the chopped fiber material is approximately 5% to approximately 30%.

4. The component of claim 1, wherein a fiber length of the chopped fiber material is approximately 0.001 inch to approximately 1.0 inch.

5. The component of claim 1, wherein a thickness of the protective layer is approximately 5 mils to approximately 200 mils.

6. The component of claim 1, wherein the protective layer is co-cured to the pressure-side surface of the blade body.

7. The component of claim 1, wherein the rotor blade is positioned within one of a fan, a compressor section, or a turbine section.

\* \* \* \* \*